Figure 1:
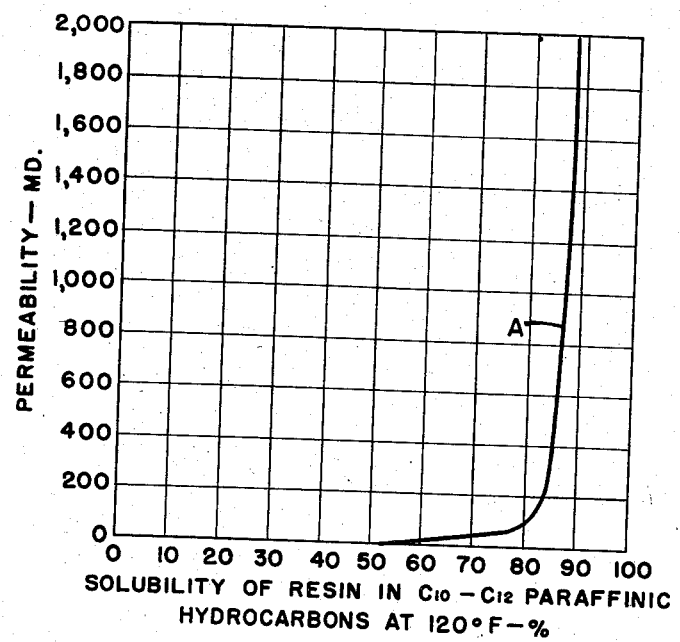

Feb. 10, 1959 P. P. SCOTT, JR 2,873,250
COMPOSITION FOR PLUGGING HIGHLY PERMEABLE FORMATIONS
Filed Dec. 28, 1953

INVENTOR.
PLATHO P. SCOTT, JR.
BY
ATTORNEY

United States Patent Office 2,873,250
Patented Feb. 10, 1959

2,873,250
COMPOSITION FOR PLUGGING HIGHLY PERMEABLE FORMATIONS

Platho P. Scott, Jr., Tulsa, Okla., assignor to Pan American Petroleum Corporation, a corporation of Delaware Application December 28, 1953, Serial No. 400,538

6 Claims. (Cl. 252—8.5)

This invention relates to the plugging of highly permeable formations such as fractured formations, and more particularly it pertains to a composition for temporarily plugging a fracture or other highly permeable zone in a well which takes whole drilling fluid and causes loss of returns of the drilling fluid.

During the drilling of oil and gas wells and the like, partial loss of returns or, in some cases, complete loss of drilling fluid returns is caused by the whole drilling fluid entering a formation having a very high permeability. For example, formations having intergranular permeability as high as 100,000 millidarcies or formations having vugs or fractures, either natural or induced, often permit the whole drilling fluid to enter and thus cause a loss of drilling fluid returns. That is, in formations of this type which are highly permeable, the colloidal materials in the drilling fluid are too small to bridge in the large pores or fractures and produce an impermeable filter cake on the well wall, and not only the colloidal material but the liquid component is lost into the formation. This loss not only tends to contaminate the formation and perhaps decrease its oil productivity, but it is expensive in that the drilling fluid which may cost as much as $12 to $15 per barrel is lost.

To overcome this loss of whole mud to highly permeable formations, the so-called lost circulation recovery materials or, more generically, bridging materials have been added to the drilling fluid to provide a bridge in the large pores, vugs, or fractures on which the smaller colloidal particles in the drilling fluid will form a filter cake and thus prevent loss of the whole mud to the formation. Generally, bridging materials are inert and insoluble particles either fibrous, lamellated, or granular which do not melt or soften at bottom hole temperatures. While the use of such bridging materials, particularly the granular type bridging materials, often restores drilling fluid returns, the permeability of the formations thus treated appears to be permanently impaired.

Figure 2:
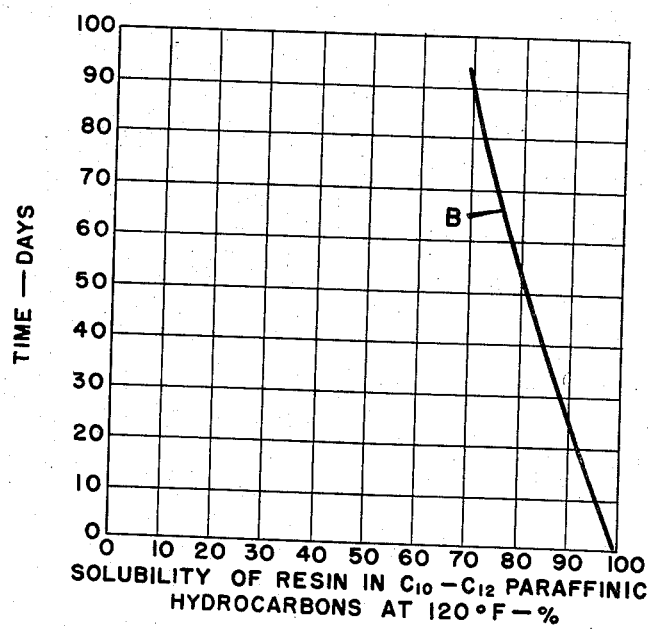

It is, therefore, an object of this invention to provide an improved composition for bridging highly permeable formations. It is a more specific object of this invention to provide a granular bridging material which is substantially insoluble in the drilling fluid but substantially completely soluble in the hydrocarbons produced by the formation drilled whereby the plugging of highly permeable zones during drilling to restore circulation does not permanently impair the permeability of the formation to the production of hydrocarbon fluids. Additional objects will become apparent from the following detailed description. In this description reference will be made to the accompanying drawings in which:

Figure 1 is a plot of the oil solubility of a partially oil-soluble bridging material used to plug highly permeable flow channels in a formation and shows the variation in ultimate permeability with the oil solubility of the soluble phase, and Figure 2 is a plot of the oil solubility of a typical resinous hydrocarbon bridging material versus time of exposure of the material to oxidation by the atmosphere.

The term "resin" in its broader aspects often refers to a high molecular weight material somewhat like rosin in appearance and properties. In this application and the appended claims, this term is intended to include those materials within the broad or generic definition which are also organic and amorphous and to include particularly the synthetic type of resins in which the simple hydrocarbon molecules are of such a nature that they will continue to react with one another and produce a high molecular weight polymer that resembles rosin in appearance and properties. This invention is thus particularly directed to the hydrocarbon resins which are like rosin in appearance, hardness, and softening properties but which differ from rosin in that the solubility in organic solvents, particularly the $C_{10}$—$C_{12}$ paraffinic hydrocarbons, is substantially higher. The natural resins such as the East India and Damar gums which are sometimes considered at least partially oil-soluble and the rosins such as abietic acid generally include hydrocarbon insoluble substances which appear to impair permanently the permeability of a formation into which such materials are injected. The synthetic hydrocarbon resins, on the other hand, in their natural state, i. e., unoxidized, appear to be substantially completely soluble in petroleum hydrocarbons at bottom hole conditions. These include resins of the coumarone, polystyrene, polyterpene, and drip oil classes which have a softening point of greater than about 150° F. by the Fisher-Johns method and a melting point higher than bottom hole temperatures. Resins of this type have also been found to be less tacky and subject to less cold flow than natural resins. That is, when the natural resins are ground into particles of a suitable size for bridging fractures, they appear to have a tendency when stored at atmospheric temperatures to flow together and produce a homogeneous mass. The synthetic hydrocarbon resins, on the other hand, being less tacky and less subject to cold flow can be stored at atmospheric temperature for substantial periods of time without having the particles cold flow whereby the material has to be reground for use.

The drip oil resins, i. e., those resins which are typically made from still bottoms and the like, are particularly desirable in this regard. One such class of materials that has been found to possess all the properties desired in a bridging material is known and available on the market as the Panarez resins, particularly Panarez 6–210 and Panarez 12–235 manufactured by Pan American Refining Corporation. These resins are made by the polymerization of a gasoline boiling range unsaturated hydrocarbon mixture produced as a byproduct of a gas-cracking process, as described in U. S. Patent 1,982,708 Thomas et al. and the patents therein cited, and particularly in U. S. Patent 2,067,073. The starting material is composed mainly of light aromatics, olefins, and diolefins as illustrated by the following approximations:

| | | | |
|---|---|---|---|
| Aromatics | 56 Vol. percent | Benzene | 39 |
| | | Toluene | 10 |
| | | Xylenes | 2.5 |
| | | $C_9$—$C_{10}$ | 4.5 |
| Olefins and Diolefins (approx. 50:50) | 41 | | 56.0 |
| Paraffins and Naphthenes | 3 | | |
| | 100 | | |

These gasoline boiling range hydrocarbons are first flash distilled to yield an 80–90 percent overhead cut and a 20–10 percent bottoms fraction. The overhead cut includes the $C_3$ and lighter constituents, the benzenes, toluenes, and xylenes, and the bottom fraction contains generally the dicyclopentadiene cut and a 300–400° F. fraction of olefins and aromatics, the latter including the major component. This bottoms fraction may be steam distilled if desired to improve the color, but generally the bottoms fraction is merely polymerized thermally at a temperature of about 450–475° F. for a period of about sixteen hours to yield a 40–45 percent cut of the drip oil resin. Panarez 6–210 resin has an iodine number of 165–175, a molecular weight of 500–600, and a specific gravity of 1.09–1.11, a melting point by the Fisher-Johns method of 190° F., and a softening point by the Fisher-Johns method of 167° F.

This resinous material is ground, preferably in the absence of an oxidizing agent to a particle size in the bridging material range. That is, it is ground to a particle size range larger than the colloidal range (3,000 mesh, theoretical, or smaller) and larger than the slimy or smooth and non-gritty range (200–300 mesh). The granular particles must, however, be in the pumpable range and are preferably in the particle size range 10–100 mesh U. S. sieve. Larger particles may be included, but preferably when larger particles are required to produce a bridge, such particles are substantially stronger than the synthetic hydrocarbon resins. These larger particles, which are typically in the pumpable range and particularly in the range 4–10 mesh U. S. sieve, are produced by grinding light weight strong materials such as nutshells including black walnut, coconut, pecan, and the like which are capable of being granulated or fruit pits including peach, plum, cherry, and the like. That is, these granular shells and pits exclude such materials as peanut shells which are incapable of being granulated and are more of the fibrous type.

In some cases, as indicated above, the resinous granules may be dispersed alone in a hydrophilic drilling fluid for producing a bridge or plug in a zone having permeability due to fractures, vugs, or the like or even due to high intergranular permeability where the fractures, vugs, or intergranular permeability is not too high to prevent the formation of a bridge. In this case, the resin is ground in a gradation of particle sizes throughout the range from about 10 mesh to about 100 mesh U. S. sieve—a gradation of particle sizes throughout the range 10–100 mesh referring herein and in the claims to a composition in which particles of substantially all sizes between 10 and 100 mesh are present. The concentration of these granular resins in the aqueous drilling fluid in which the resin is insoluble may vary from about 5 to about 100 pounds per barrel. In one field test in the Sprayberry, four pounds of a 2–1 mixture of ground resin and walnut shells in an aqueous drilling fluid were successfully used to recover circulation. Preferably the concentration of the granular resin in the drilling fluid is, however, in the range 25–50 pounds or more per barrel. The resin, being of about the same specific gravity as the usual drilling fluid, is easily suspended in it. A viscosity of 30–40 seconds via the Marsh funnel is usually adequate to prevent settling of the bridging material in the mud pits.

In the preferred embodiment as indicated above, this granular synthetic hydrocarbon resin is combined with a hard granular light weight bridging material selected from the class of woody granules including granular nutshells and granular fruit pits. These woody granules comprise preferably, as indicated, large particles having sizes throughout the range of about 4–10 mesh U. S. sieve. The ratio of woody inert granules to synthetic hydrocarbon resinous oil-soluble granules preferably varies from about 1 to 3 parts resinous granules to 1 part of woody granules. Referring now to Figure 1 of the drawings, the ultimate permeability versus oil solubility of various compositions of the preferred temporary bridging materials mixed with inert granular bridging material has been plotted as curve A. The composition consisted of 1 part granular black walnut shells having a gradation of particles throughout the range 4–10 mesh and 2 parts by weight of a gradation of a resin having a gradation of particles throughout the range 10–100 mesh. Various resins having a wide range of oil-insoluble residues were mixed with the coarse woody granules to show the effect of permanent impairment to permeability by oil insolubles in the resins. The mixture of woody granules and resinous granules was placed 1 inch deep on the screen in a standard A. P. I. fluid loss apparatus as disclosed in A. P. I. Code 29, and a $C_{10}$—$C_{12}$ paraffinic hydrocarbon was displaced downwardly through this bed at a differential pressure of 20 pounds per square inch and at a temperature of 120° F. After a large surplus of these paraffinic hydrocarbons had been filtered through the bed and the soluble components of the resins had been removed by dissolution, the permeability to the hydrocarbons was determined in accordance with the following equation:

$$K = \frac{CQL}{\Delta PA}$$

where K equals permeability in millidarcies, C equals a constant, specifically 96.5, Q equals the volume of filtrate in cubic centimeters per minute, L equals the depth of the filter bed in inches, P equals pressure drop across the bed in pounds per square inch, and A equals the cross-sectional area of the bed in square inches. Various resins including, for example, East India Batu gum, abietic acid, and synthetic hydrocarbon resins, and mixtures thereof were tested by this means. As indicated by the curve, the resins having lower than about 80 percent solubility in the hydrocarbons materially impaired the permeability of the bed while resins having greater than about 80 percent solubility, i. e., less than about 20 percent insolubles, produced a bed or plug which after dissolution of the resin left the bed substantially as permeable as the coarse woody granules themselves which had a permeability on this basis of 2100 millidarcies. The synthetic hydrocarbon resins including the coumarone, polystyrene, and drip oil resins and some modified rosins were found to have an oil solubility in $C_{10}$—$C_{12}$ paraffinic hydrocarbons of greater than 80 percent and, therefore, did not materially reduce the final permeability of the bed. Such resins, therefore, in combination with the coarse woody granules are considered to be satisfactory bridging materials. From a number of field tests, this test appears to be indicative of the results to be expected in actual operations.

As is well known, many of these film-forming resins contain aromatic and unsaturated hydrocarbons and, therefore, tend to oxidize upon exposure to the atmosphere. The oxidized resins are less soluble in $C_{10}$—$C_{12}$ hydrocarbons than the unoxidized resins. A typical synthetic hydrocarbon resin, particularly Panarez 6–210 described above, was ground as above described in a hammer mill until the particle size distribution was in the range 10–100. This gradation of particles was then exposed in an open dish to the atmosphere and the solubility in paraffinic hydrocarbons determined as a function of time over a period of ninety days. Curve B, Figure 2, is a plot of the solubility of that resin in $C_{10}$—$C_{12}$ hydrocarbons over this period of time. It can be seen that after a period of about forty days the concentration of the oxidized hydrocarbons together with the other insolubles constituted about 20 percent of the composition. With this high concentration of insolubles, the permeability of a bed of coarse woody granules as described in connection with Figure 1 is materially reduced. Accordingly, it is desirable that after the resin has been ground to the desired particle size range, it should be stored in a non-oxidizing atmosphere. This may include by way of example a non-oxygen containing atmosphere, such as nitrogen, or a liquid atmosphere, such as water. The liquid atmosphere is also sometimes desirable to inhibit completely the cold flowing of the particles so that they will not bond together during storage. The woody granules may, of course, be mixed with the resinous granules and the two may be stored together or the two types of particles may be separately mixed into the drilling fluid at the well.

The temporary bridging material mixture above described may be disposed in any drilling fluid which does not readily dissolve the resinous granules. A water-base drilling fluid, typically a water and 2–5 percent bentonite or starch mixture, is preferred. The concentration of this mixture in the drilling fluid may be varied over a substantial range. Generally, the higher the concentration of the bridging material, the quicker a bridge will form in a highly permeable flow channel. Preferably between about 25 and about 300 pounds of these mixed granules per barrel of drilling fluid is employed. When this slurry is displaced to the bottom of the well in the course of circulating the drilling fluid, it appears that the larger particles, i. e., the strong woody granules, first bridge within the flow channels or at the mouth thereof and that the smaller oil-soluble particles bridge on these larger oil-insoluble particles. The colloid in the mud and the smaller oil-soluble particles then form a substantially water-impermeable filter cake on the face of the formation. This cake thus contains a substantial proportion of oil-soluble materials so that after the well has been completed and placed on production and oil is flowing from the formation into the well, the petroleum hydrocarbons contact and disintegrate a large part of the bridge and filter cake. The oil-insoluble materials may be but probably are not removed by the flow of well fluids. These particles, however, being coarse, do not by themselves materially restrict the flow of fluids into the well.

Manifestly, a composition containing oil-soluble bridging materials which do not have a substantial proportion of insolubles is capable of many applications where the loss of fluid is a problem in deep oil and gas wells. Thus, while the invention has been described with particular reference to the use of resinous granules alone and combined with woody granules in aqueous drilling fluids for recovering circulation, these materials can be employed to advantage in other oil field applications such as the cementing of casing, squeeze cementing, the placing of screens, sealing formation packers, blanketing, and in hydraulic fracturing operations. Accordingly, this invention is not to be construed to be limited to the invention as described in detail but should be construed in accordance with the scope of the appended claims.

I claim:

1. A composition for temporarily plugging highly permeable zones penetrated by a well comprising from about 1 to about 3 parts of a granular synthetic hydrocarbon resin having a gradation of particles throughout the range 10–100 mesh and about 1 part of a strong woody granular material having a gradation of particles throughout the range 4–10 mesh, said synthetic hydrocarbon resin being substantially completely soluble in $C_{10}$—$C_{12}$ paraffinic hydrocarbons whereby the impermeable plug produced with said composition may be permeabilized by flowing petroleum hydrocarbons therethrough.

2. A composition according to claim 1 wherein said woody granular material is selected from the class consisting of granular hard nutshells and granular fruit pits.

3. A composition according to claim 1 wherein said synthetic hydrocarbon resin is a polymerized bottom fraction of unsaturated hydrocarbons boiling in the gasoline range.

4. A composition according to claim 1 wherein said synthetic hydrocarbon resin has a softening point of greater than about 150° F. by the Fisher-Johns method and a melting point higher than the bottom hole temperature in said well.

5. A drilling fluid including a water base, a water dispersible colloid and a composition for temporarily plugging highly permeable zones in a well comprising from about 1 to about 3 parts of a granular synthetic hydrocarbon resin having a gradation of particles throughout the range 10–100 mesh and about 1 part of a strong woody granular material having a gradation of particles throughout the range 4–10 mesh, said granular synthetic hydrocarbon resin being substantially completely soluble in crude hydrocarbons, having a softening point greater than about 150° F. by the Fisher-Johns method, and a melting point higher than the bottom hole temperature in said well, and said composition being in the concentration range of about 25–300 pounds per barrel of said drilling fluid, whereby a permeable zone penetrated by said well may be temporarily impermeabilized to water and to said drilling fluid but may be removed by contact with the hydrocarbons produced by said well.

6. A composition for temporarily plugging a fracture in a zone penetrated by a well comprising about two parts by weight of a hydrocarbon resin having at least 80 percent soluble in a surplus of $C_{10}$—$C_{12}$ paraffinic hydrocarbons and having a gradation of particle sizes throughout the range 10–100 mesh and one part of a substantially water and oil insoluble woody granular material having a gradation of particle sizes throughout the range 4–10 mesh.

References Cited in the file of this patent

UNITED STATES PATENTS

| | | |
|---|---|---|
| 2,477,219 | Van Dyke | July 26, 1949 |
| 2,650,195 | Cardwell et al. | Aug. 25, 1953 |
| 2,734,861 | Scott et al. | Feb. 14, 1956 |
| 2,747,839 | Moore | May 29, 1956 |
| 2,773,670 | Miller | Dec. 11, 1956 |
| 2,779,415 | Howard | Jan. 29, 1957 |
| 2,805,720 | Wiegand | Sept. 10, 1957 |

OTHER REFERENCES

Silent-Circulation Losses, article in the Oil and Gas Journal, May 21, 1936, pages 72, 75, 78, 79, and 80.

Rogers: Compositions and Properties of Oil Well Drilling Fluids, revised edition, published 1953 by Gulf Publishing Co. of Houston, Texas, page 562.